3,026,342
PROCESS FOR THE PRODUCTION OF ALIPHATIC ω AMINO CARBOXYLIC ACIDS
Karl Wüst, Hanau am Main, Germany, assignor to Deutsche Gold- und Silber-Scheideanstalt vormals Roessler, Frankfurt am Main, Germany
No Drawing. Filed July 20, 1959, Ser. No. 828,079
Claims priority, application Germany July 19, 1958
8 Claims. (Cl. 260—404)

The present invention relates to an improved process for the production of aliphatic ω amino carboxylic acids.

The object of the present invention is to produce amino carboxylic acids of high purity by means of a more time saving and economical process than has hitherto been available.

It has been known to the art that ω amino nitriles, such as β amino propionitrile, γ aminio butyronitrile and ζ amino enanthonitrile, can be saponified, under pressure if necessary, to the corresponding ω amino carboxylic acids using calcium hydroxide or barium hydroxide as the saponifying agent. These alkaline saponification techniques, however, when attempted on the longer chained ω amino nitriles, require long reaction times, of about 8 to 10 hours, and the reaction solutions of the higher ω amino carboxylic acids are difficult to work with, when a carbon chain of more than 9 carbon atoms is involved. In addition, the products of such reaction techniques always contain appreciable amounts of barium or calcium.

The art is also aware of the fact that it is possible to saponify amino nitriles under acid conditions to the amino acids, for example, with hydrochloric acid. This technique produces mixtures of the hydrochloride salt of the amino carboxylic acid and ammonium chloride, from which the recovery of the amino carboxylic acids is difficult.

It has now been found by the process according to the invention, that it is possible to produce very pure aliphatic ω amino carboxylic acids, by treating the hydrochloride salt of the corresponding ω amino carboxylic acid with liquid ammonia and decomposing the resulting ammoniacal ω amino carboxylic acid. According to this inventive process it is not necessary, to proceed from the pure hydrochloride salt of the ω amino carboxylic acid. It is also possible to use raw mixtures of these hydrochloride salts of the ω amino carboxylic acids and ammonium chloride, as are formed in the production of the amino nitriles by the hydrochloric acid hydrolysis technique.

By this treatment with ammonia, the hydrogen chloride, which is combined to the amino group, is converted even at low temperatures to ammonium chloride, which, together with the ammonium chloride which is formed during the production of the hydrochloride salts of the amino carboxylic acids by hydrolysis, is dissolved by the liquid ammonia. Surprisingly, at the same time, all the resinous by-products, which may also be formed during the production of the hydrochloride salts of the amino carboxylic acids, are also taken up by the liquid ammonia. In view of the removal of these resins, the ω amino carboxylic acids are obtained in such a very pure form, that, in general, they can be used without further purification for polycondensation reactions for the production of polyamides. In addition, they contain no metallic contaminants such as barium or calcium.

Thus, according to the invention, it is possible to use hydrochloride salts of amino carboxylic acids which contain more than two and preferably 4 to 16 $CH_2$ groups, or mixtures of these salts with ammonium chloride. The treatment of the hydrochloride salts of the amino carboxylic acids with the liquid ammonia does not result in the loss by dissolution of any appreciable quantities of the desired amino acid products as long as they contain more than 4 $CH_2$ groups in their molecule structure. However, with the lower members of the series of these compounds, as for example, δ amino valeric acid, the yield is somewhat reduced due to the higher solubility of the acid in the liquid ammonia.

It has also been discovered, that the liquid ammonia treatment technique of the invention can yield δ amino valeric acid, which otherwise has been difficult to obtain because of its unusual tendency to cyclization to a stable lactam ring.

It is advantageous to conduct the treatment with the liquid ammonia under normal pressure at a temperature of about −30° C. to −45° C. In many cases, however, it may also be favorable to work under superatmospheric pressure with temperatures of about 0° C. to room temperature.

The subsequent decomposition of the ammoniacal-amino carboxylic acid compound that is formed during the liquid ammonia treatment, is preferably carried out at room temperature or at slightly raised temperatures of about 20 to 60° C. and in a vacuum if desired. After this decomposition of these ammoniacal-amino carboxylic acid compounds the amino carboxylic acids precipitate out in a powdery form.

Furthermore it has been found, that the process of the invention can be improved even further, if, after the decomposition step, which in this case is preferably carried out at an increased temperature, the decomposed materials are additionally treated with liquid ammonia and/or with water, alcohols, such as methyl alcohol, ethyl alcohol etc. or aliphatic or aromatic hydrocarbons, such as benzene, toluene, xylene, or mixtures of them. Preferably, this additional treatment is so conducted, that the solid decomposed materials are at room temperature, at least at the beginning of such subsequent treatment.

The hydrochloride salts of the ω amino carboxylic acids or their mixtures with ammonium chloride, which have been produced by known techniques, such as, by a hydroylsis (at 110° C. for example) of the hydrochloride salt of the corresponding amino nitrilium compound of the general formula

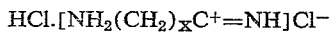

are expediently used as the starting materials for the process according to the invention.

It is of further advantage, to produce the nitrilium compounds from ω amino carboxylic acid nitriles, for example, by hydrolysis with hydrochloric acid. The ω amino nitriles to be used in this case are preferably produced from the corresponding chloronitriles by such known techniques, for example, as are described in German application D 27 400.

The process according to the invention can also be conducted as a continuous operation.

A particular advantage of this process exists in the fact, that when chloronitriles are used as the starting materials for the production of the ω amino carboxylic acids only hydrochloric acid and lime need be supplied to the process, as the liquid ammonia which is required for the conversion of the corresponding hydrochloride salt to the ω amino carboxylic acid, can be recycled, as can be seen from the following flowsheet:

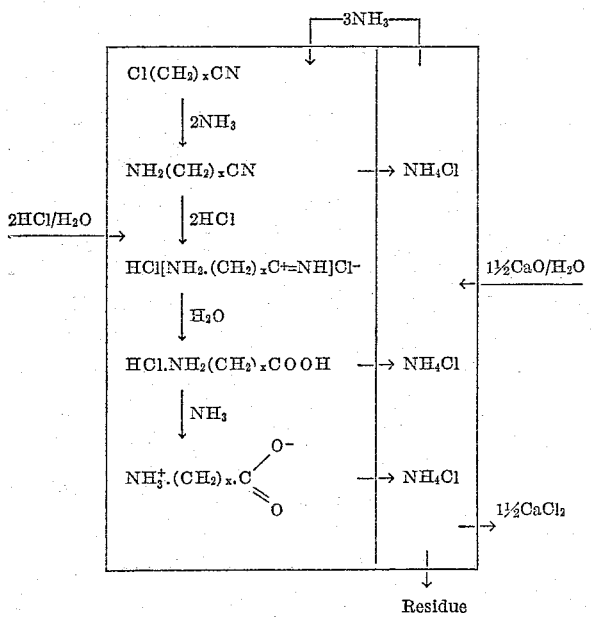

A further advantage of the process according to the invention is that it does not require application of pressure.

The following examples will serve to illustrate several embodiments of the process according to the invention.

Example 1

63 parts by weight of ζ amino enanthonitrile were stirred into 84 parts by volume of concentrated hydrochloric acid while maintaining a temperature of about −2° C. by external cooling. This solution was then refluxed at 110° C. for four hours. The crude reaction mixture thus obtained was then concentrated from 158.6 parts by weight to 113.1 parts by weight. Next, 112.4 parts by weight of this concentrated crude reaction mixture were treated with 800 parts by volume of liquid ammonia for 45 minutes while stirring intensively. The solids in the mixture were filtered off and covered with liquid ammonia and filtered again several times. The filtered product was then extracted four times with 300 parts by volume of liquid ammonia (each time), and after each extraction and filtration the filtered product was covered with 50 parts by volume of liquid ammonia. The extractions were carried out at −30 to −45° C.

The ammonia was removed from the ammoniacal amino carboxylic acid compound thus produced by heating it in a vacuum at 50 to 60° C. In order to obtain a polymerizable compound, however, it is necessary to treat the amino carboxylic acid once or twice more with 300 parts by volume of liquid ammonia. The yield of ζ amino enanthic acid was 58.8 parts by weight or 81% of the theoretical. After the ammonia was recovered from the extract, 11.9 parts by weight of a brownish yellow, alcohol soluble, viscous by-product as well as 58.8 parts by weight of NH$_4$Cl were isolated from it.

Example 2

63 parts by weight of ζ amino enanthonitrile were introduced into 168 parts by volume of concentrated hydrochloric acid while the mixture was constantly stirred and cooled (0° to −3° C.). The mixture was then hydrolized at 110° C. for 7.5 hours. The 241.8 parts by weight of the reaction product that were produced were concentrated to 139.6 parts by weight. This concentrate was then treated with 137 parts by weight of liquid ammonia and processed as in Example 1. Repeated alcoholic extractions of the product at room temperature with 250 parts by volume of ethyl alcohol yielded 60 parts by weight (82.5% of the theoretical) of polymerizable ζ amino enanthic acid. In addition, 9.8 parts by weight of a yellow brown, viscous by-product as well as 55.2 parts by weight of NH$_4$Cl were isolated.

Example 3

77.2 parts by weight of ω amino pelargonic acid nitrile were introduced into 86 parts by volume of concentrated hydrochloric acid while the mixture was constantly stirred and cooled (at −2° C.). The mixture was then hydrolized at 110° C. for 2 hours. The resulting 174.4 parts by weight of the reaction product were concentrated to 166.9 parts by weight. 163.7 parts by weight of this concentrate were treated with liquid ammonia as in Example 1 to produce 66.7 parts by weight of ω amino pelargonic acid which was 77.5% of the theoretical. 14.8 parts by weight of a viscous, slightly yellow brown by-product and 46.2 parts by weight of NH$_4$Cl were isolated from the ammonia extract.

Example 4

A saponification was conducted with Ba(OH)$_2$ as the saponifying agent to compare the results obtained with those of Example 3. 100 parts by weight of ω amino pelargonitrile and 138 parts by weight of Ba(OH)$_2$.8H$_2$O were saponified for 6¼ hours at 100° C. After precipitating out the barium with ammonium carbonate 86.5 parts by weight of ω amino pelargonic acid were produced which was 77.3% of the theoretical.

Example 5

30.1 parts by weight of ω amino undecylic acid nitrile were introduced at 0° C. with constant stirring and cooling into 63.5 parts by volume of concentrated hydrochloric acid and hydrolized at 110 to 128° C. for 2 hours. 96.0 parts by weight of a reaction product were thereby produced which were concentrated to 56.1 parts by weight. For the liquid ammonia treatment, 52.4 parts by weight of this concentrate were treated with 500 parts by volume of liquid ammonia and repeatedly thereafter with 100 parts by volume of ammonia so that the concentrate was covered two to four times with 100 parts by volume (each time) of liquid ammonia. 27.9 parts by weight (77% of the theoretical) of ω amino undecylic acid were thus produced. 7.9 parts by weight of a yellow by-product and 17.9 parts by weight of NH$_4$Cl were isolated from the NH$_3$ extract.

Example 6

59 parts by weight of an ω amino pentadecylic acid nitrile fraction, which contained, in addition to a principal (C$_{15}$) fraction, lower amino acids (C$_{11}$ to C$_{13}$) and higher amino acids (C$_{17}$ to C$_{19}$), were added with continuous stirring and cooling (at 0° C.) to 120 parts by weight of concentrated hydrochloric acid and the mixture was then hydrolized at 110° C. for 4 hours. The resulting 179.6 parts by weight of reaction mixture were concentrated to 151.5 parts by weight. 141.1 parts by weight of this concentrate were then treated with 750 parts by volume of liquid ammonia for 30 minutes at 60 to 75° C. under a gauge pressure of 30 to 35 atmospheres. After filtering and further treating the filtrate with 1100 parts by volume of liquid ammonia at −30° C. to −45° C. there resulted a yield of 76% of the theoretical amino acids of which ω amino pentadecylic acid was the major component and which also contained lower and higher amino acids. 11.6 parts by weight of a yellow brown impurity as well as 36.3 parts by weight of ammonium chloride were isolated from the ammonia extract.

Example 7

18.5 parts by weight of δ amino valeronitrile were introduced with constant stirring and cooling (to 0° C.) into 6.5 parts by volume of concentrated hydrochloric acid and the mixture was hydrolized for 2 hours at 110° C. The resulting 85.6 parts by weight of reaction mixture were concentrated to 37.4 parts by weight. The product was then consecutively extracted with 500 parts by volume and then 100 parts by volume of liquid ammonia as well as covered 5 times with 50 parts by volume of liquid ammonia each time. Due to the relatively high solubility of amino valeric acid in liquid ammonia, only 7.1 parts by weight of δ amino valeric acid were thus produced, or 32% of the theoretical. However, about 7 parts by weight of δ amino valeric acid of a lower grade of purity were recovered from the ammonia extract, which when added to the next charge to be treated with liquid ammonia, resulted in an increase of the combined yield of δ amino valeric acid to about 60% of the theoretical. Furthermore, 7 parts by weight of a yellow, viscous by-product and 14 parts by weight of ammonium chloride were recovered from the ammonia extract.

I claim:

1. A process for the production of saturated aliphatic ω amino carboxylic acids comprising treating hydrochloric acid salts of the ω amino carboxylic acids with liquid ammonia to form an ammoniacal ω amino carboxylic acid compound in solid form and a solution of ammonium chloride in liquid ammonia, filtering the solid materials from the reaction system, extracting the solid materials with liquid ammonia and heating the remaining solid ammoniacal ω amino carboxylic acid to remove ammonia therefrom.

2. A process as in claim 1 in which mixtures of ammonium chloride and hydrochloric acid salts of the ω amino carboxylic acids are treated with the liquid ammonia.

3. A process as in claim 1 in which the liquid ammonia treatment is conducted under atmospheric pressure at a temperature of −30° to −45° C.

4. A process as in claim 1 in which the liquid ammonia treatment is conducted under superatmospheric pressure at a temperature of 0° C. to room temperature.

5. A process as in claim 1 in which said heating is conducted at about 20 to 60° C.

6. A process as in claim 5 in which said heating is conducted in a vacuum.

7. A process as in claim 5 further comprising extracting the solid ω amino carboxylic acids produced with at least one extracting agent selected from the group consisting of liquid ammonia, water, alcohols, aliphatic hydrocarbons, aromatic hydrocarbons, and mixtures of them, the solids to be extracted being at room temperature at least at the initiation of said extraction.

8. A process as in claim 1 which is conducted continuously.

References Cited in the file of this patent
UNITED STATES PATENTS 2,674,607    Genas _____ Apr. 6, 1954

OTHER REFERENCES

Franklin: Am. Chem. J. 20, 826 (1898).
Houben: Die Methoden Der Organischen Chemie, Drette Auflage (third ed.), p. 734 (1941), vol. 4, Edwards Bros., Inc., Ann Arbor, Michigan.